United States Patent [19]

Maeda et al.

[11] Patent Number: 5,233,166
[45] Date of Patent: Aug. 3, 1993

[54] CERAMIC HEATER

[75] Inventors: Masahito Maeda; Michio Ohno; Toshihiko Kobe, all of Kokubu, Japan

[73] Assignee: Kyocera Corporation, Kyoto, Japan

[21] Appl. No.: 909,628

[22] Filed: Jul. 7, 1992

[30] Foreign Application Priority Data

Jul. 31, 1991 [JP] Japan .................... 3-191889

[51] Int. Cl.⁵ .................................................. H05B 3/02
[52] U.S. Cl. ..................................... 219/552; 219/544; 219/553; 219/270
[58] Field of Search ............. 219/552, 544, 270, 553; 501/97, 98

[56] References Cited

U.S. PATENT DOCUMENTS

| | | | |
|---|---|---|---|
| 4,357,526 | 11/1982 | Yamamoto | 219/544 |
| 4,376,652 | 3/1983 | Buljan | 501/97 |
| 4,440,707 | 4/1984 | Shimamori et al. | 264/65 |
| 4,746,636 | 5/1988 | Yokoyama | 501/97 |
| 4,912,305 | 3/1990 | Tatemasu et al. | 219/544 |

*Primary Examiner*—Bruce A. Reynolds
*Assistant Examiner*—Michael D. Switzer
*Attorney, Agent, or Firm*—Spensley Horn Jubas & Lubitz

[57] ABSTRACT

A ceramic heater comprising a ceramic sintered body of silicon nitride matrix and a heating resistor of an inorganic conductor embedded in the sintered body, characterized in that the ceramic sintered body of silicon nitride matrix comprises 8 to 19 weight % of a rare earth element when calculated by conversion in terms of the amount of oxide, 2 to 7 weight % of silicon oxide ($SiO_2$) and 7 to 20 weight % of molybdenum silicide or titanium nitride, and that electrode clamps holding lead wires are brazed to the side surfaces of the ceramic heater respectively via metalized layers so that the heating resistor is electrically connected to the lead wires via the electrode clamps.

The ceramic heater of the present invention is free from breakage of the heating resistor, change in resistance and deterioration in the structure of the ceramic sintered body of silicon nitride matrix, is superior in oxidation resistance, durability and quick temperature rising characteristics, and can be used continuously for an extended period of time at high temperatures while maintaining the excellent strength of the ceramic sintered body of silicon nitride matrix.

9 Claims, 2 Drawing Sheets

CERAMIC HEATER

BACKGROUND OF THE INVENTION

1. Field of the Invention

The present invention relates to a high-temperature ceramic heater used as an ignition heater for various combustion apparatuses and also used as a heater for various heating apparatuses.

2. Prior Art

A sheath heater or the like with a heating resistor comprising heat-resistant insulating powder and a metal wire with a high melting point embedded in a heat-resistant metal sheath has been used as an ignition heater for various combustion apparatuses which burn gas and kerosene and has also been used as a heater for various heating apparatuses.

The above-mentioned sheath heater, however, has some defects. It cannot exhibit quick temperature rising characteristics since heat is transmitted via the heat-resistant insulation powder. It is inferior in oxidation resistance and durability. In addition, it lacks reliability for positive ignition and raises problems in safety.

To solve such problems, a ceramic heater comprising a heating resistor of an inorganic conductor embedded in a ceramic sintered body, which can quickly raise temperature, can be used for an extended period of time regardless of environmental conditions and is superior in ignition reliability and safety, has been used widely as an ignition source for various combustion and heating apparatuses.

The most popular type of such a ceramic heater is featured such that silicon nitride superior to other ceramic materials in thermal shock resistance and high-temperature strength is used as a heater substrate and a heating resistor made of a metal with a high melting point such as tungsten (W) or molybdenum (Mo) or a compound of these metals is embedded in the heater substrate, or a ceramic heater wherein heating resistor paste mainly composed of one of the above-mentioned metals with high melting points or a compound of such metals is pattern-printed on the above-mentioned substrate and sintered into one body.

However, a ceramic heater wherein a conventional silicon nitride sintered body is used as the substrate causes deterioration in the strength and structure of the silicon nitride sintered body, since a glass component comprising alumina ($Al_2O_3$), magnesia (MgO), calcia (CaO), etc. and remaining in the grain boundaries of the sintered body is softened when the temperature of the heater is raised over 1,000° C. by electric heating. This deterioration generates cracks in a part of the silicon nitride sintered body adjacent to the heating resistor and lowers oxidation resistance.

To eliminate the above-mentioned defects, a ceramic heater 12 has been proposed wherein a main heating element 10 made of titanium nitride or vanadium nitride, being as conductive as metals, is built in a silicon nitride sintered body 11 which is superior in mechanical property, heat resistance, thermal shock resistance and chemical stability at high temperatures, as shown in FIG. 3 (Japanese Patent Publication No. 62-59858).

However if the above-mentioned ceramic heater 12 is used to ignite kerosene or oil fan heater or to generate high temperatures exceeding 1,300° C., the ceramic heater is required to have durability at such high temperatures exceeding 1,300° C. to achieve positive ignition, stability and reliability. In particular, when the ceramic heater 12 is used to ignite various gas combustion apparatuses, the heater is requested to have even higher heat resistance at temperatures exceeding 1,400° C. and quick temperature rising characteristics represented by an ignition temperature reaching period of not more than 3 seconds. In an electricity application cycle test wherein each cycle consists of a quick temperature rising period during which 1,500° C. is reached within 10 seconds after AC voltage regulated to saturate at 1,500° C. for example is applied and a constant electricity application stop period, the ignition heater used for this test is required to withstand 10,000 cycles. The above-mentioned ceramic heater 12 cannot satisfy the specified characteristics for the electricity application cycle test. The main heating element 10 of the ceramic heater 12 may be broken or its resistance may be changed. In addition, the silicon nitride sintered body 11 itself, used as the substrate of the ceramic heater 12, tends to oxidize. For these problems, the above-mentioned ceramic heater 12 lacks in durability and reliability when used as a source for ignition and heating at high temperatures. Furthermore, the ceramic heater 12 cannot shorten the time required to reach 1,000° C. to 5 seconds or less.

SUMMARY OF THE INVENTION

The present invention has been developed to eliminate the above-mentioned defects of the prior art. The object of the present invention is to provide a ceramic heater which is usable continuously for an extended period of time at high temperatures exceeding 1,400° C., superior in oxidation resistance and durability, and excellent in quick temperature rising characteristics.

The present invention provides a ceramic heater comprising a ceramic sintered body of silicon nitride matrix and a heating resistor of an inorganic conductor embedded in the sintered body, wherein the ceramic sintered body of silicon nitride matrix comprises 8 to 19 weight % of a rare earth element when calculated by conversion in terms of the amount of oxide, 2 to 7 weight % of silicon oxide ($SiO_2$) and 7 to 20 weight % of molybdenum silicide or titanium nitride.

In the ceramic heater of the present invention, if the content of a rare earth element such as ytterbium (Yb), erbium (Er) or dysprosium (Dy) used as a sintering aid in the ceramic sintered body of silicon nitride matrix is less than 8 weight % when calculated by conversion in terms of the amount of oxide, the sintering performance of the silicon nitride lowers, preventing the silicon nitride from making close contact and integration with the heating resistor, thus causing the heating resistor to be broken. Consequently, the durability of the ceramic heater is less than 10,000 cycles in the above-mentioned electricity application cycle test.

If the above-mentioned content exceeds 19 weight %, the oxidation of the ceramic sintered body of silicon nitride matrix itself is accelerated and the durability is less than 10,000 cycles just as the case described above.

The content of the rare earth element is thus specified to 8 to 19 weight % or preferably 11 to 14 weight % when calculated by conversion in terms of the amount of oxide.

On the other hand, the content of silicon oxide ($SiO_2$) as an unavoidable impurity is an amount calculated by using the amount of the remaining oxygen obtained by subtracting the amount of the oxygen contained as the oxide of the rare earth element from the total amount of the oxygen included in the ceramic sintered body of silicon nitride matrix. If the content is less than 2 weight %, the sintering performance of the silicon nitride is defective and the silicon nitride is oxidized at low temperature ranges, unable to withstand the above-mentioned electricity application cycle test.

If the content exceeds 7 weight %, the strength of the ceramic sintered body of silicon nitride matrix at high temperatures reduces and cracks are generated in the ceramic sintered body of silicon nitride matrix because of a slight difference in thermal expansion between the ceramic sintered body of a silicon nitride matrix and the heating resistor. As a result, the heating resistor may be broken and its resistance may change during the above-mentioned electricity application cycle test.

The content of the silicon oxide ($SiO_2$) is thus specified to 2 to 7 weight or preferably 3 to 6 weight %.

Furthermore, since the molybdenum silicide or the titanium nitride used as an additive acts to increase the thermal expansion coefficient of the ceramic sintered body of silicon nitride matrix, if the content of the molybdenum silicide or titanium nitride is less than 7 weight %, the difference in thermal expansion between the ceramic sintered body of silicon nitride matrix and the heating resistor exceeds $1.3 \times 10^{-6}/°C$. in a temperature range of 1,200° to 1,500° C., causing the heating resistor to be broken during the electricity application cycle test conducted in the above-mentioned conditions.

If the content exceeds 20 weight %, the insulation performance of the ceramic sintered body of silicon nitride matrix between the adjacent portions of the heating resistor is deteriorated, causing short circuits between the portions of the heating resistor.

The content of the molybdenum silicide or the titanium nitride is thus specified to 7 to 20 weight % or preferably 8 to 13 weight %.

Besides, the content of the glass component comprising alumina ($Al_2O_3$), magnesia (MgO), calcia (CaO), etc. should be 1.0 weight % or less or preferably 0.5 weight % or less.

The ceramic heater of the present invention will be explained below referring to the attached drawings of examples of the present invention.

DETAILED DESCRIPTION OF THE PREFERRED EMBODIMENT

Figure 1:
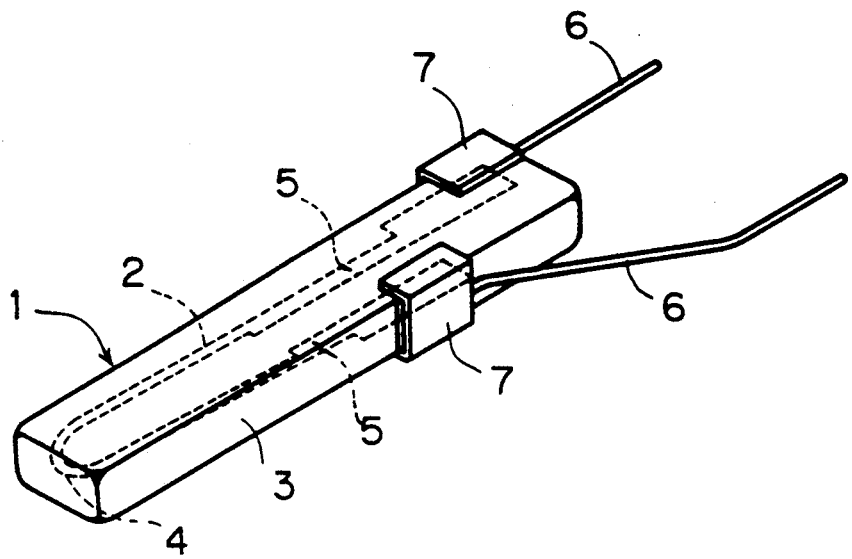
FIG. 1 is a perspective view of an example of the ceramic heater of the present invention.

Referring to FIG. 1, numeral 1 represents a ceramic heater comprising a ceramic sintered body of silicon nitride matrix 3 and a heating resistor 2 of an inorganic conductor embedded in the ceramic sintered body of silicon nitride matrix. The two lead sections 5 of the ceramic heater 1 are partially exposed on both sides thereof and used as electrodes. Two electrode clamps 7 holding lead wires 6 are brazed to the electrodes respectively via the metalized layers coated on the electrodes so that the heating resistor 2 is electrically connected to the lead wires 6 via the electrode clamps 7.

Figure 2:
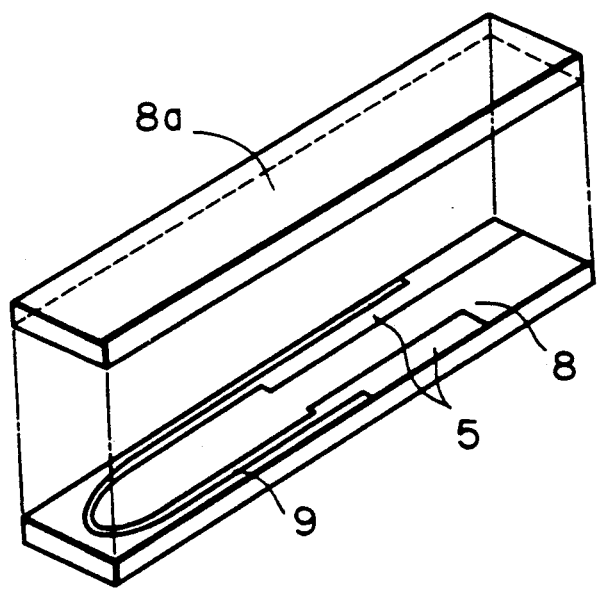
FIG. 2 is a perspective view for explaining the production process of the ceramic heater of the present invention.
Figure 3:
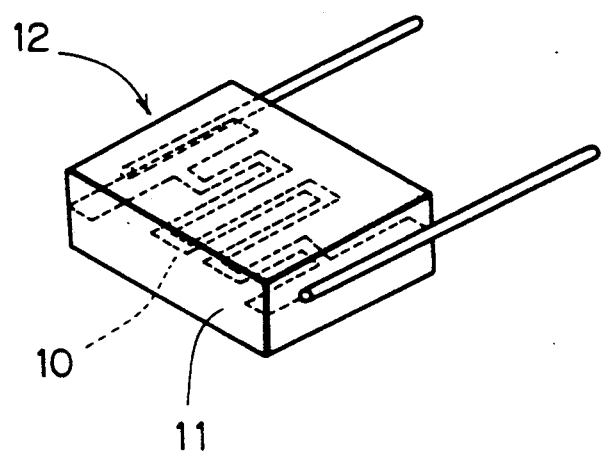
FIG. 3 is a perspective view of a conventional ceramic heater.

To form the heating element of the ceramic heater 1, a heating resistor pattern 9 and the lead sections 5 are thick-film printed simultaneously by the screen printing method at the specified positions on a crude ceramic plate of silicon nitride 8 as shown in FIG. 2, and then on the top surface of the plate, another crude ceramic plate of silicon nitride 8a is laminated and sintered into one body under pressure. Instead of simultaneously printing the lead sections 5 and the heating resistor pattern 9, the lead sections 5 may be provided by separate printing after the pattern 9 is formed.

In the ceramic heater of the present invention, the heating resistor 2 comprising an inorganic conductor is preferably made of a metal with a high melting point, such as tungsten (W), molybdenum (Mo) or rhenium (Re), or carbide, nitride or boride of a metal having a positive resistance temperature coefficient and selected from the 4a, 5a or 6a group of the periodic table, such as tungsten carbide (WC), titanium nitride (TiN), molybdenum silicide ($MoSi_2$) or zirconium boride ($ZrB_2$).

The ceramic heater of the present invention was evaluated as described below. An oxide of a rare earth element and silicon oxide ($SiO_2$) used as sintering aids, and molybdenum silicide or titanium nitride used as an additive were first mixed in a variety of mixture ratios with silicon nitride ($Si_3N_4$) powder having a specific surface area of 12 $m^2/g$ and an alpha conversion ratio of 97% and including oxygen used as an inevitable impurity amounting to 3 or less weight % of silicon oxide ($SiO_2$) so that the compositions listed in Table 1 were obtained. The components of each powder composition were then wet-mixed in a bowl mill for 24 hours.

TABLE 1

| Sample No. | Composition of ceramic sintered body of silicon nitride matrix (Weight %) | | | | Composition of heating resistor (Volume %) | |
|---|---|---|---|---|---|---|
| | Oxide of rare earth element | $SiO_2$ | $MoSi_2$ | TiN | Inorganic conductor | $Si_3N_4$ |
| *1 | $Yb_2O_3$ | 7.0 | 2.5 | 8.5 | — | WC 67 | 33 |
| 2 | $Yb_2O_3$ | 8.0 | 3.5 | 10.0 | — | WC 40 | 60 |
| 3 | $Yb_2O_3$ | 10.0 | 4.0 | 11.0 | — | WC 50 | 50 |
| 4 | $Yb_2O_3$ | 11.0 | 4.0 | 10.0 | — | WC 70 | 30 |
| 5 | $Yb_2O_3$ | 12.0 | 4.5 | 12.0 | — | WC 60 | 40 |
| 6 | $Yb_2O_3$ | 14.0 | 4.0 | 10.0 | — | WC 70 | 30 |
| 7 | $Yb_2O_3$ | 15.0 | 5.0 | 14.0 | — | WC 70 | 30 |
| 8 | $Yb_2O_3$ | 19.0 | 6.0 | 18.0 | — | WC 80 | 20 |
| *9 | $Yb_2O_3$ | 20.0 | 6.5 | 10.0 | — | WC 90 | 10 |
| *10 | $Yb_2O_3$ | 12.0 | 1.5 | 10.0 | — | WC 100 | 0 |
| 11 | $Yb_2O_3$ | 12.0 | 2.0 | 9.0 | — | WC 40 | 60 |
| 12 | $Yb_2O_3$ | 12.0 | 3.0 | 10.0 | — | WC 45 | 55 |
| 13 | $Yb_2O_3$ | 12.0 | 4.0 | 12.0 | — | WC 50 | 50 |
| 14 | $Yb_2O_3$ | 12.0 | 6.0 | 14.0 | -- | WC 55 | 45 |
| 15 | $Yb_2O_3$ | 12.0 | 7.0 | 18.0 | -- | WC 60 | 40 |
| *16 | $Yb_2O_3$ | 12.0 | 8.0 | 11.0 | — | WC 65 | 35 |
| *17 | $Yb_2O_3$ | 12.0 | 2.5 | 6.0 | — | WC 70 | 30 |
| 18 | $Yb_2O_3$ | 12.0 | 3.0 | 7.0 | — | WC 75 | 25 |
| 19 | $Yb_2O_3$ | 12.0 | 3.0 | 8.0 | — | WC 80 | 20 |
| 20 | $Yb_2O_3$ | 12.0 | 4.0 | 9.0 | — | WC 80 | 20 |
| 21 | $Yb_2O_3$ | 12.0 | 4.5 | 10.0 | — | WC 85 | 15 |
| 22 | $Yb_2O_3$ | 12.0 | 4.0 | 13.0 | — | WC 70 | 30 |
| 23 | $Yb_2O_3$ | 12.0 | 5.0 | 15.0 | — | WC 90 | 10 |
| 24 | $Yb_2O_3$ | 12.0 | 6.0 | 20.0 | — | WC 95 | 5 |
| *25 | $Yb_2O_3$ | 12.0 | 6.5 | 21.0 | — | WC 100 | 0 |
| 26 | $Yb_2O_3$ | 12.0 | 5.5 | — | 8.0 | WC 90 | 10 |
| 27 | $Yb_2O_3$ | 12.0 | 4.0 | — | 9.0 | WC 70 | 30 |
| 28 | $Yb_2O_3$ | 12.0 | 4.0 | — | 10.0 | TaN 80 | 20 |
| 29 | $Yb_2O_3$ | 12.0 | 5.0 | — | 11.0 | WC 70 | 30 |
| 30 | $Yb_2O_3$ | 12.0 | 4.0 | — | 13.0 | WC 70 | 30 |

TABLE 1-continued

| Sample No. | Composition of ceramic sintered body of silicon nitride matrix (Weight %) | | | | Composition of heating resistor (Volume %) | |
|---|---|---|---|---|---|---|
| | Oxide of rare earth element | SiO$_2$ | MoSi$_2$ | TiN | Inorganic conductor | Si$_3$N$_4$ |
| 31 | Yb$_2$O$_3$ 12.0 | 4.0 | 10.0 | — | TiN 75 | 25 |

Note:
1. The sample whose numbers are marked * are out of the ranges of the claims of the present invention.
2. The values in the columns of the composition of each heating resistor are the volume % values of the components of the composition, obtained on the basis of analysis values attained after firing.

The slurry of each mixture obtained was sprayed, dried and granulated, then subjected to a press forming method to form crude ceramic plates of silicon nitride 8, 8a.

Next, binders and organic solvents were added to the mixture of the above-mentioned inorganic conductor powder and silicon nitride (Si$_3$N$_4$) powder which had been adjusted to have the compositions listed in Table 1, and mixed by a vibration mill for 24 hours. A viscosity adjustment solvent was then added to the obtained mixture to adjust the paste for the heating resistor.

By using the paste for the heating resistor obtained as described above, the roughly U-shaped heating resistor pattern 9 and the lead sections 5 were subjected to thick-film printing on the top surface of the above-mentioned crude ceramic plate of silicon nitride 8 by the screen printing method. Another crude ceramic plate of silicon nitride 8a having the same shape as that of the above-mentioned crude ceramic plate of silicon nitride 8 was then laminated to hold the heating resistor pattern 9 and the lead sections 5 between the two crude ceramic plates of silicon nitride in the vertical direction and sintered together under pressure.

The side surfaces of the heating resistor obtained in this way were ground so that the lead sections 5 were exposed partially and used as electrodes. After metalized layers were coated over at least the exposed portions of the electrodes, the electrode clamps 7 holding the lead wires 6 were brazed to the exposed portions, thereby forming the plate-shaped ceramic heater 1.

Each ceramic heater produced as described above was heated abruptly to 1,500° C. by applying AC voltage, which was regulated to cause saturation at 1,500° C., for 60 seconds, and then electricity application was stopped for 30 seconds while the heater was cooled by compressed air. This electricity application cycle test wherein each cycle consists of the above-mentioned electricity application and nonapplication processes was conducted to evaluate the durability of the heater.

Furthermore, bar-shaped test pieces measuring 3.1 mm in height, 3.5 mm in width and 18 mm in length were formed from plates of ceramic sintered bodies of silicon nitride matrix and heating resistors having the same compositions as those of the above-mentioned ceramic sintered bodies of silicon nitride matrix and the heating resistors respectively. The thermal expansion coefficients of these test pieces in the range of 1,100° to 1,500° C. were measured by using a differential thermal expansion meter and compared with those of the reference samples, then the difference in thermal expansion for each heating element was calculated.

The results were listed in Tables 2.

TABLE 2

| Sample No. | Electricity application cycle test (Cycles) | Difference in thermal expansion ($\times 10^{-6}$ °C.) | Remarks |
|---|---|---|---|
| *1 | 50 | 1.25 | Broken heating resistor |
| 2 | 20.000 | 1.0 | No abnormality |
| 3 | 20.000 | 1.0 | " |
| 4 | 20.000 | 1.1 | " |
| 5 | 20.000 | 1.0 | " |
| 6 | 20.000 | 1.1 | " |
| 7 | 20.000 | 0.95 | " |
| 8 | 20.000 | 0.8 | " |
| *9 | Interruption | 1.25 | Oxidized ceramic sintered body of silicon nitride matrix |
| *10 | Interruption | 1.3 | Oxidized ceramic sintered body of silicon nitride matrix |
| 11 | 20.000 | 1.05 | No abnormality |
| 12 | 20.000 | 1.0 | " |
| 13 | 20.000 | 0.95 | " |
| 14 | 20.000 | 0.85 | " |
| 15 | 20.000 | 0.7 | " |
| *16 | 50 | 1.05 | Cracked ceramic sintered body of silicon nitride matrix |
| *17 | 100 | 1.35 | Broken heating resistor |
| 18 | 20.000 | 1.3 | No abnormality |
| 19 | 20.000 | 1.3 | " |
| 20 | 20.000 | 1.3 | " |
| 21 | 20.000 | 1.2 | " |
| 22 | 20.000 | 0.95 | " |
| 23 | 20.000 | 1.0 | " |
| 24 | 20.000 | 0.25 | " |
| *25 | — | 0.25 | Deteriorated insulation |
| 26 | 20.000 | 1.3 | No abnormality |
| 27 | 20.000 | 1.15 | " |
| 28 | 20.000 | 0.8 | " |
| 29 | 20.000 | 1.1 | " |
| 30 | 20.000 | 0.95 | " |
| 31 | 20.000 | 1.25 | " |

Note:
1. The samples whose numbers are marked * are out of the ranges of the claims of the present invention.
2. The blank (—) in the table above indicates that the ceramic sintered body of silicon nitride matrix was not oxidized or cracked and that the heating resistor was not broken.

As clearly indicated in Table 2, it was confirmed that the high-temperature durability of all the ceramic heater samples of the present invention was not less than 20,000 cycles and that no oxidation was found on the surfaces of the ceramic sintered bodies of silicon nitride matrix. In addition, all the ceramic heater samples of the present invention achieved quick heating performance; about one second was required to reach 1,000° C.

As described above, the ceramic heater provided by the present invention is free from breakage of the heating resistor, change in resistance and deterioration in the structure of the ceramic sintered body of silicon nitride matrix during electric heating, is superior in oxidation resistance, durability and quick temperature rising characteristics, and can be used continuously for an extended period of time at high temperatures while maintaining the excellent strength of the ceramic sintered body of silicon nitride matrix.

We claim:

1. A ceramic heater comprising a ceramic sintered body of silicon nitride matrix and a heating resistor of an inorganic conductor embedded in the sintered body, characterized in that the ceramic sintered body of silicon nitride matrix comprises 8 to 19 weight % of a rare earth element when calculated by conversion in terms of the amount of oxide, 2 to 7 weight % of silicon oxide (SiO$_2$) and 7 to 20 weight % of molybdenum silicide or titanium nitride, the amount of molybdenum silicide or titanium nitride and of silicon oxide being selected to give said ceramic sintered body a thermal expansion coefficient which differs from the thermal expansion coefficient of said heating resistor by not more than 1.3×10$^{-6}$/°C. in a temperature range of 1200°–1500° C.

2. A ceramic heater according to claim 1, wherein the ceramic sintered body of silicon nitride matrix comprises 11 to 14 weight % of a rare earth element when calculated by conversion in terms of the amount of oxide, 3 to 6 weight % of silicon oxide and 8 to 13 weight % of molybdenum silicide or titanium nitride.

3. A ceramic heater according to claim 1 or 2, wherein the rare earth element is ytterbium (Yb, erbium (Er) or dysprosium (Dy).

4. A ceramic heater according to claim 1 or 2, wherein the heating resistor comprising an inorganic conductor is made of a metal with a high melting point or carbide, nitride or boride of a metal having a positive resistance temperature coefficient and selected from the 4a, 5a or 6a group of the periodic table.

5. A ceramic heater according to claim 4, wherein the metal with a high melting point is tungsten (W), molybdenum (Mo) or rhenium (Re), or the carbide, nitride or boride is tungsten carbide (WC), titanium nitride (TiN), molybdenum silicide (MoSi$_2$) or zirconium boride (ZrB$_2$) respectively.

6. A ceramic heater comprising a ceramic sintered body of silicon nitride matrix and a heating resistor of an inorganic conductor, which is obtained by laminating a crude ceramic plate of silicon nitride having no printed heating resistor pattern on a crude ceramic plate of silicon nitride having a heating resistor pattern thick-film printed at a desired position by the screen printing method and by subsequently sintering both plates into one body under pressure, wherein said ceramic sintered body of silicon nitride matrix comprises 8 to 19 weight % of a rare earth element when calculated by conversion in terms of the amount of oxide, 2 to 7 weight % of silicon oxide (SiO$_2$) and 7 to 20 weight % of molybdenum silicide or titanium nitride, the amount of molybdenum silicide or titanium nitride and of silicon oxide being selected to give said ceramic sintered body a thermal expansion coefficient which differs from the thermal expansion coefficient of said heating resistor by not more than 1.3×10$^{-6}$/° C. in a temperature range of 1200°–1500° C.

7. A ceramic heater according to claim 6, wherein the ceramic sintered body of silicon nitride matrix comprises 11 to 14 weight % of a rare earth element when calculated by conversion in terms of the amount of oxide, 3 to 6 weight % of silicon oxide and 8 to 13 weight % of molybdenum silicide or titanium nitride.

8. A ceramic heater according to claim 1, wherein the ceramic sintered body contains 57–78.5 weight percent of silicon nitride.

9. A ceramic heater according to claim 6, wherein the ceramic sintered body contains 57–78.5 weight percent of silicon nitride.

* * * * *